United States Patent Office 3,017,439
Patented Jan. 16, 1962

3,017,439
PROCESS FOR THE PRODUCTION OF NITROCYCLODODECANE AND CYCLODODECANE OXIME
Gunther Wilke, and Hermann Weslau, Mulheim (Ruhr), Germany, assignors to Studiengesellschaft Kohle m.b.H., Mulheim (Ruhr), Germany, a corporation of Germany
No Drawing. Filed Apr. 16, 1958, Ser. No. 729,033
Claims priority, application Germany April 18, 1957
17 Claims. (Cl. 260—644)

Belgian Patents 555,180 and 564,175 describe processes for the production of cyclododecatrienes-(1,5,9). Cyclododecatrienes-(1,5,9) are a suitable starting material for the preparation of dodecane-1,12-dicarboxylic acid and of the lactam of 12-amino-dodecane-carboxylic-acid, both of which are used for the production of super polyamides. An important method of producing the lactam could be via the nitrocyclododecane.

An object of the invention is a process for the production of nitrocyclododecane whereby cyclododecane is nitrated, the thus obtained nitro-compound dissolved in aqueous alkali metal hydroxide, the non reacted cyclododecane separated, for example by extraction with low boiling hydrocarbons or ethers and the alkaline solution worked up in the usual manner.

Suitable nitrating agents are, for example, nitric acid in various concentrations, aluminum nitrate hydrates and nitrogen dioxide. When using the nitric acid in vapor state or aluminum nitrate hydrates or nitrogen dioxide, the suitable operating temperatures are between 170 and 200° C. Since the boiling point of the cyclododecane is above the temperature required for the nitration, the reaction may be carried out in an open vessel, for example by passing gaseous nitric acid or nitrogen dioxide through the suitably pre-heated cyclododecane.

The nitration with diluted nitric acid must be carried out in an autoclave, since the vapor pressure of the acid at the nitration temperature is above atmospheric pressure. Suitable operating temperatures are temperatures between 100 and 250° C. preferably between 100 and 140° C.

The end product obtained by the nitration is nitrocyclododecane as a pale yellow oil with a boiling point of 110 to 115° C./0.6 mm. Hg and a refractive index $n_D^{20}$ = 1.4868. This compound is a valuable starting material for organic synthesis processes, in particular for the production of $C_{12}$-lactams which can in turn be processed to novel textile fibers made of the corresponding super polyamides.

It is already known to nitrate aliphatic and cycloaliphatic hydrocarbons by the reaction of hydrocarbons with anhydrous nitrogen dioxide at elevated temperatures and pressures in a homogeneous liquid phase. Furthermore, it is known to nitrate saturated alicyclic hydrocarbons or their substitution products at temperatures above 100° C. with superheated gaseous nitric acid or with higher nitrogen oxides, suitably in amounts not sufficient for complete nitration. Finally, it is also known to produce nitrocyclooctane by reacting cyclooctane and aqueous solutions of nitric acid or solid metal nitrate hydrates at temperatures between 100 and 150° C.

This 8-membered ring is the highest ring, the nitration of which is known.

It was not to be expected that the nitration of cyclododecane would proceed without difficulties under the operating conditions used for the nitration of open chained paraffines and cyclic paraffines with 5 to 8 carbon atoms. It is known that the synthesis production as well as the properties of saturated isocyclic rings with 8 to 13 carbon atoms, but in particular with 9 to 12 carbon atoms, show specific characteristics. More than thirty years ago, Ruzicka has systematically determined the yields obtained with a poor ring closure method (without dilution) (cf. dotted curves I by Ziegler and Aurnhammer in "Liebig's Annalen," vol. 513, p. 46 (1934)). The 8-membered ring was here obtained in a yield of 20%, the 9-membered ring in a yield of approximately 2% and the rings with 10, 11 and 12 members in a yield of less than 1%. This alone already indicates that the 8-membered ring does not fall under the actual ring closure minimum. If the ring closure reaction is carried out properly, i.e. in the appropriate dilution, then the difference between the 8-membered ring and the rings with 5, 6 and 7 carbon atoms will disappear practically completely (cf. solid curve II by Ziegler and Aurnhammer, loc. cit.). The true particularities are very clearly recognizable only in the case of rings with 9–12 carbon atoms, whereas the 13-membered ring shows a transitional behaviour. From the above alone it is already obvious that the properties of the rings with 9–12 carbon atoms cannot be predicted from the properties of the ring with 8 carbon atoms. Furthermore, several chemical reactions are known in which the behaviour of the 8-membered ring differs radically from that of the 9-membered ring. Thus cyclooctanone does react with aqueous alcoholic sodium hydrogen sulfite, whereas cyclononanone does not (cf. L. Ruzicka and W. Brugger, Helv. vol. 9, p. 396 (1926), and Sj. Kaarsemaker and J. Coops, R., vol. 70, p. 1040 (1951)). It is further known that higher cyclic ketones can be obtained from lower cyclic ketones by treating them with diazomethane under enlargement of the ring. This reaction is quite suitable for the production of cyclooctanone from cyclohexanone via the cycloheptanone. Attempts to go further and to obtain cyclononanone meet, however, with difficulties and it is practically impossible to go beyond this. The reaction is again successful in the case of higher cyclic ketones (with more than 13 carbon atoms) (cf. E. Mosettig and A. Burger, Am. Soc., vol. 52, p. 3456 (1930), E. P. Kohler a. o., Am. Soc., vol. 61, pp. 1058 and 1061 (1939), Sj. Kaarsemaker and J. Coops, R., vol. 70, p. 1033 ff. (1951)). It is thus to be noted that the particular characteristics of medium-sized rings are at best barely indicated, but certainly not fully developed in the 8-membered ring, so that it is not possible to arrive at any conclusions concerning rings with 9–13 carbon atoms on the basis of 8-membered rings and even less on the basis of rings with fewer members.

This special position of the medium-sized rings can possibly be explained by the ring tension theory of Pitzer (cf. V. Prelog Soc., pp. 423–424 (1950), particularly FIGS. 8a and b and R. Huisgen, Angew, Chem., vol. 69, p. 342 (1957)).

It has now been discovered that also the novel nitrocyclododecane has certain particular characteristics, inasmuch as it can be converted into a crystalline, substantially permanently stabile aci-form. This property, too, is due to the special conditions in the $C_{12}$-ring.

It is known that primary and secondary nitro compounds go into solution when shaken with aqueous or alcoholic alkali metal hydroxyd. This fact is the basis of the separation processes used to separate the nitro compounds resulting from the nitrating process from the non reacted hydrocarbons. The solubility in alkali is due to the fact that the normal nitro compound is converted to an acid form, the so-called aci-form, the alkali metal salt of which is soluble in water:

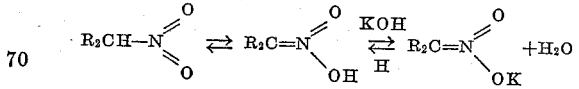

If such a solution is again cautiously acidified, for example by introduction of carbon dioxide, there is first precipitated the aci-form of the nitro compound. The aci-form is, however, not stable and converts at once into the normal nitro-form. This behaviour applies to all aliphatic nitro compounds thus far known (F. Klages, Lehrbuch der org. Chemie, 2nd edition (1957), vol. 2, pp. 380–1). Only in a few cases was it possible to isolate a pure, although meta stable aci-form from nitro compounds substituted with phenyl radicals. Best known is the case of phenyl nitromethane (Gattermann and Wieland, "Die Praxis des org. Chemikers," 36th edition (1954), pp. 222–228), the aci-form of which can be obtained in crystalline form when working rapidly. However, for this and similar compounds, the adjacent phenyl radical is decisive for the stabilization, since it interacts with the double bond of the aci-nitro group.

In accordance with the invention, aci-nitrocyclododecane is produced by dissolving the nitrocyclododecane in a solution of alkali metal hydroxide in an organic solvent, suitably methanol, and diluting this solution with water. The diluted solution is acidified, the aci-nitrocyclododecane being separated in crystalline form. Any suitable acid, such as sulfuric acid or glacial acetic acid may be used for the acidification. Preferably, however, solid carbon dioxide is used for the acidification. The precipitate is sucked off and re-crystallized, for example from ether. The aci-nitrocyclododecane crystallizes in the form of well developed needles and melts at approximately 100° C. under slight decomposition.

In order to obtain the aci-form, it is not necessary to isolate the nitrocyclododecane from the product obtained by the nitration of the cyclododecane. This product can be directly dissolved in ether and, after separating off the aqueous layer, mixed with organic solutions of alkali metal hydroxides. After separation and dilution of the alkaline phase with water, the product can be immediately neutralized, for example with gaseous or solid carbon dioxide.

The process for the preparation of the aci-nitrocyclododecane according to the invention obtains its great technical importance from the fact that this form of nitrocyclododecane can, in analogy to processes which as such are known, be directly converted to the corresponding oxime.

It is for instance known that nitrocyclohexane can be hydrogenated to its oxime with alcohols via the aci-form obtained in statu nascendi. Because of the extreme instability of the aci-nitrocyclohexane, this process requires an extremely careful control of the operating conditions which, moreover, necessitate a large consumption of auxiliary agents if too extensive side reactions are to be avoided. According to another process, the nitrocyclohexane is converted to 1,1-chloro-nitrocyclohexane which can be selectively hydrogenated to the oxime in the presence of a palladium-barium sulfate catalyst, an aci-form being also formed during this hydrogenation after the primary separation of the halogene as an intermediate product.

The above described operating methods do not have to be applied in the case of nitrocyclododecane because of the surprising stability displayed by the aci-form which is obtainable by a simple method. The claimed preparation of aci-nitrocyclododecane represents thus a considerable simplification of the synthetic production of the 13-membered lactam from the cyclododecane.

According to the invention, the aci-nitrocyclododecane is converted to the omixe by dissolving or suspending the aci-nitrocyclododecane in an organic solvent and subjecting it to a mild selective reduction. Suitable reduction agents include for example methanol containing traces of glacial acetic acid or hydroxylamine hydrochloride or hydrogen sulfide in hexane or cyclohexane. The reduction may also be effected by selective hydrogenation, for example in the presence of a palladium-barium sulfate catalyst in tetrahydrofuran.

*Example 1*

60 g. of cyclododecane and 60 cc. of nitric acid (density 1.2) are heated in an autoclave 4 hours at 127 to 135° C. The reaction product is dissolved in ether and separated from the aqueous layer. The etheric solution is vigorously stirred one hour with an aqueous solution of 21 g. of potassium hydroxide in 60 cc. of water. The alkaline solution is then saturated with $CO_2$ and extracted with ether. Upon distillation in vacuo, 15.2 g. of nitrocyclododecane are obtained; boiling point 110–115° C./0.6 mm. Hg, refractive index $n_D^{20}=1.4868$. The yield amounts to 65% of the reacted cyclododecane.

*Example 2*

In the apparatus described by Grundmann (Die Chemie, vol. 56, p. 159 (1943)) 95 g. of cyclodecane and 40 cc. of nitric acid (70%) are reacted at 200 to 210° C. during 5 hours.

According to the procedure of Example 1, there are obtained 21.9 g. of nitrocyclododecane in addition to 12 g. of carboxylic acids; yield 45% of the reacted cyclododecane.

*Example 3*

20 g. nitrocyclododecane are dissolved in 40 cc. of a 2.7 n solution of potassium hydroxide in methanol. After one hour, this solution is diluted with water to 1 liter and mixed under stirring with solid carbon dioxide. When the pH of the solution has reached 7, the entire nitro compound is precipitated as a microcrystalline white powder. The precipitate is sucked off and squeezed out. The moist filter-cake is then dissolved in one liter of boiling ether, the solution separated from the water by decantation and immediately cooled to −10 to −20° C. The crystalline slurry is sucked off, washed with a slight amount of cold ether and dried in vacuo. Fine needles. Yield 15.8 g. (79%); melting point 105° C. (under decomposition).

*Example 4*

20 g. of nitrocyclododecane are dissolved in a solution of potassium hydroxide in methanol as in Example 3 and diluted with water to 1 liter. This solution is neutralized under cooling with ice with 2 n $H_2SO_4$, against bromocresol purple as indicator (half-life pH approximately 6). The precipitate is sucked off, thoroughly washed with cold water and dried. Yield 19.5 g. (97.5%); melting point 95° C. (under decomposition). This product, which was not recrystallized, was stable for about 5 days without decomposition or conversion.

*Example 5*

600 g. of cyclododecane, 680 g. of nitric acid (density 1.2) and 65 g. of potassium nitrate are heated for 10 hours to 110° C. in a 2-liter-autoclave provided with magnetic stirrers. The content of the autoclave is dissolved in ether and, after separation of the aqueous layer, mixed with 80 g. of potassium hydroxide in methanol. After ½ hour, the mixture is diluted with 2.5 l. of water, the aqueous layer is separated and the residual layer neutralized with solid carbon dioxide. The precipitated aci-nitrocyclododecane is sucked off and immediately recrystallized from ether. Yield 86 g. (11.3%); melting point 101° C. (under decomposition). From the mother lye there are obtained an additional 23 g. of nitrocyclododecane. Total yield of nitrocyclododecane 80% of the reacted cyclododecane; 490 g. cyclododecane (82%) were recovered.

*Example 6*

To 5 g. of aci-nitrocyclododecane suspended in 50 cc. of methanol there are added 2 cc. of glacial acetic acid. The mixture is quickly heated to 60° C. under stirring and maintained 15 minutes at this temperature. The solution is then poured into water, the formed oxime dissolved in ether and recovered by concentration of the etheric solution. The product is recrystallized from hexane.

Yield:
2.3 g. oxime (49%); melting point 132° C.
1.6 g. ketone (38%); melting point 61° C.
0.35 g. nitro-compound (8%).

Example 7

5 g. aci-nitrocyclododecane are suspended together with 0.5 g. of hydroxylamine hydrochloride in 50 cc. of methanol and heated for 15 minutes to 60° C. After recrystallization from hexane there were obtained:

3.5 g. oxime (77%); melting point 132° C.
0.4 g. ketone (10%); melting point 61° C.
0.35 g. nitro-compound (8%).

Example 8

5 g. of aci-nitrocyclododecane are suspended in 50 cc. of cyclohexane and hydrogen sulfide is introduced at 40° C. Upon cooling, 4.2 g. of oxime, melting point 131° C., are crystallized out.

Example 9

6 g. of aci-nitrocyclododecane, 100 cc. of tetrahydrofuran, and 4 g. of 5% palladium barium sulfate are agitated for 2 hours in a shaking autoclave at a hydrogen pressure of 120 atmospheres at room temperature. Upon working up, there are obtained 1.55 g. oxime (28%); melting point 132° C.
3.7 g. nitro-compound (62%) and
A small amount of amine, traces of ketone.

We claim:
1. A member selected from the group consisting of nitrocyclododecane and aci-nitrocyclododecane.
2. Process for the production of nitrocyclododecane which comprises reacting cyclododecane with a nitrating agent selected from the group consisting of gaseous nitric acid, nitrogen dioxide and aluminum nitrate hydrates, dissolving the nitro compound formed in a solution of an alkali metal hydroxide and recovering the nitrocyclododecane formed.
3. Process according to claim 2, in which said solution of alkali metal hydroxide is an organic solution and in which the organic solution formed by dissolving the nitro compound in said organic solution of an alkali metal hydroxide is diluted with water and the non-reacted cyclododecane separated by extraction prior to said recovery.
4. Process according to claim 2, in which said nitration is effected at temperatures between 170 and 200° C.
5. Process according to claim 2, in which said nitration is effected by passing gaseous nitric acid through said cyclododecane in an open vessel preheated to temperatures of about 170° to 200° C.
6. Process according to claim 2, in which said nitration is effected by passing nitrogen dioxide through said cyclododecane in an open vessel preheated to temperatures between 170° and 200° C.
7. Process according to claim 2, in which said nitration is effected with diluted nitric acid in an autoclave at temperatures of between 100° and 250° C.
8. Process according to claim 7, in which said nitration is effected with diluted nitric acid in an autoclave at a temperature of between 130 and 140° C.
9. Process according to claim 2, in which the organic solution formed by diluting the nitro compound in said organic solution of an alkali metal hydroxide is diluted with water and the non-reacted cyclododecane is separated by extraction with a solvent selected from the group consisting of low boiling hydrocarbons and ethers prior to said recovery.
10. Process according to claim 9 in which said extraction is effected with ether and which includes saturating the alkaline solution with carbon dioxide prior to said extraction.
11. Process for the production of aci-nitrocyclododecane which comprises dissolving nitrocyclododecane in a solution of an alkali metal hydroxide, acidifying the solution and recovering the aci-nitrocyclododecane formed.
12. Process according to claim 11, in which after said dissolving the solution formed is diluted with water and acidified with an acid and the aci-nitrocyclododecane formed precipitates and is recovered by filtration.
13. Process according to claim 11 in which said nitrocyclododecane is in the form of a crude product obtained by the nitration of cyclododecane.
14. Process according to claim 11, in which said acidification is effected with sulfuric acid.
15. Process according to claim 11 in which said acidification is effected with glacial acetic acid.
16. Process according to claim 11 in which said acidification is effected with carbon dioxide.
17. Process according to claim 16 in which said carbon dioxide is in solid form.

References Cited in the file of this patent
UNITED STATES PATENTS

| | | |
|---|---|---|
| 2,181,531 | Hass et al. | Nov. 28, 1939 |
| 2,673,223 | Wood | Mar. 23, 1954 |
| 2,763,685 | Donaruma | Sept. 18, 1956 |
| 2,800,508 | Rieber et al. | July 23, 1957 |